June 27, 1967 C. M. TARIS 3,328,788

VERIFICATION OF MAGNETIC RECORDING

Filed Nov. 26, 1963

INVENTOR
C. M. TARIS
BY Richard C. Levy
ATTORNEY

United States Patent Office 3,328,788

Patented June 27, 1967

3,328,788

VERIFICATION OF MAGNETIC RECORDING

Charles M. Taris, Cranford, N.J., assignor to Bell Telephone Laboratories Incorporated, New York, N.Y., a corporation of New York Filed Nov. 26, 1963, Ser. No. 325,868
7 Claims. (Cl. 340—174.1)

Figure 1:
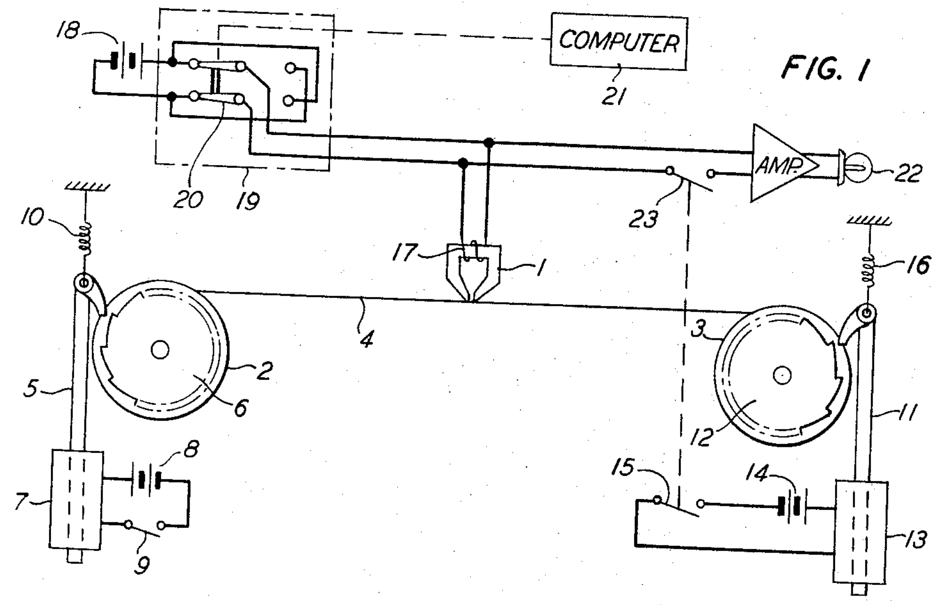

This invention relates to magnetic recording techniques, and more particularly, to methods and apparatus for verifying that binary information is being properly recorded by an incremental magnetic recorder.

In the recording of binary information on the surface of a magnetic storage medium, the flux patterns into which stored binary digits are encoded generally conform to one of three basic formats; namely, the return-to-zero (RZ) format, the return-to-bias (RB) format, or the nonreturn-to-zero (NRZ) format. As is familiar to those skilled in the art, these encoded formats are directly related to the wave forms in which current is applied to a magnetic writing head disposed in proximity with the storage medium. In recorders adhering to the RZ format, the storage medium is initially magnetically neutral, and while the medium is in motion, a current impulse of relatively short duration and having a polarity corresponding to the binary symbol being recorded is applied to the head. In recorders adhering to the RB format, the magnetic medium is prebiased to saturation in one direction, which represents one binary symbol of information, and when the other binary symbol is to be recorded, a current impulse of relatively short duration, and having an amplitude and polarity sufficient to saturate the medium in the other direction, is applied to the head while the medium is in motion. Finally, in recorders adhering to the NRZ format, current of either polarity having sufficient amplitude to saturate the storage medium is continuously applied to the head, and the presence or absence of a polarity reversal in this current, and correspondingly the presence or absence of a magnetic saturation reversal on the storage medium, represents one or the other binary symbols of information.

Although the aforementioned RZ and RB modes of operation find considerable application in the magnetic recordation of binary information, it is nevertheless frequently the case that NRZ-type recording is preferable. For example, in systems requiring an especially high packing density, the NRZ format is advantageous in that binary symbols are recorded as single saturation reversals rather than as magnetic pulses, which in effect constitute at least a pair of saturation reversals. In addition, system considerations may dictate that the full magnetic capabilities of the storage medium be utilized, in which case the NRZ format is again suitable inasmuch as the magnetic condition of the medium is varied between opposite extremes of saturation. Moreover, such a system may further be required to write new data on to the medium over old data which is to be discarded, that is to say, the recording operation must also be self-erasing. This latter requirement is inherently met by the NRZ mode of recording since saturation current is continuously present in the write head.

Unfortunately, considerable difficulty has been encountered, heretofore, in providing a relatively inexpensive, yet highly reliable in-service technique for verifying that a magnetic recorder having an incremental transport is properly recording binary information in the NRZ format. In the past, the numerous attempts to solve this problem have met only limited degrees of success. It has been proposed, for example, that the current in the writing head be monitored to determine whether or not magnetic flux signals are being applied to the storage medium. This method does not give assurance, however, that the storage medium is properly responding to the applied flux. Another proposed solution involves the use of a specialized recording head having a read gap and a write gap spaced apart from each other along the tape. The gaps are positioned relative to each other such that the write gap inpresses a magnetic signal upon the medium, and shortly thereafter, as the medium traverses the head, the read gap senses whether of not the magnetic signal has been properly recorded. Owing to the physical dimensions of the structure involved in this procedure, however, it has been found that spacing between the read and write gaps is unavoidable, in a typical implementation at least fifty digits in length. Consequently, in a recorder having an incremental transport, that is to say, the storage medium is stepped in fixed increments relative to the head and binary information is written into the medium during the interstep intervals, the medium must be stepped a considerable number of increments, for example fifty, before the presence of a test signal recorded on the medium can be verified. Although such an arrangement is theoretically feasible, a mechanical stepping mechanism is required having a deviation in the order of one or two percent. Such an item would be extremely costly in situations where high packing densities are required, and consequently would serve to diminish the economic benefit to be derived from in-service verification.

In view of the foregoing, one object of the invention is to verify that an incremental-stepping magnetic recording device is working properly in the NRZ mode.

Another object of the invention is to reduce the complexity of equipment necessary to provide reliable, in-service verification of an incremental-stepping magnetic recorder.

A further object of the invention is to determine immediately whether or not an incremental-stepping magnetic recorder is properly recording input data.

The foregoing and other objects of the invention are achieved by a verification technique in which a test signal is first stored on the magnetic storage medium of a recorder being tested, and is detected immediately thereafter by first terminating the writing current in the head which recorded the test signal, and then reverse-stepping the storage medium, thereby moving the test signal under the head. During the rearward motion of the medium, the test signal, if properly stored, is sensed by the head which in turn provides a positive verification signal. Thereafter, current is restored in the head with a polarity opposite to that which existed immediately prior to the aforementioned termination thereof. Consequently, subsequent storage of information on the medium erases the test signal.

The prinicipal feature of the invention resides in the provision of immediate, in-service assurance that an incremental magnetic recording device, which is operating in the NRZ mode, is properly recording binary input information.

Figures 2A, 2B, 2C:
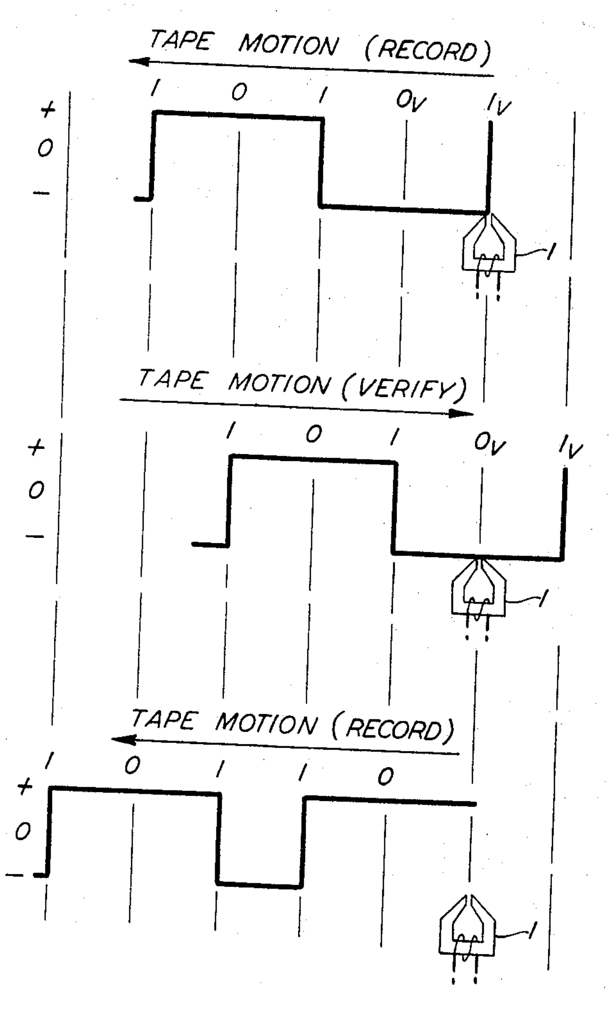

The foregoing and other objects, features and advantages of the invention will be more thoroughly understood by reference to the following detailed description of an illustrative embodiment of the invention in conjunction with the drawing in which:

FIG. 1 is a schematic diagram of an incremental-stepping magnetic recording device equipped to practice the present invention; and FIGS. 2A, 2B and 2C are NRZ flux patterns of a magnetic recording medium useful in explaining the invention.

With reference to the drawing, FIG. 1 shows an incremental-stepping magnetic recording device adapted to employ the verification technique of the present invention to determine whether or not binary information is being properly recorded. The recording device comprises a conventional magnetic head 1 and a reversible transport mechanism including reels 2 and 3 for stepping a magnetic dium, such as tape 4, under head 1 in a fixed incrents. The transport is constructed to step tape 4 in the ward direction, that is to say, from right to left, under action of a pawl 5 which drives a ratchet wheel 6, coally attached to reel 2, in the counterclockwise direction. wl 5 is actuated downwardly into a driving stroke by solenoid 7, which is energized by a battery 8 through switch 9, and is returned upwardly to its disengaged sition by a spring 10. Tape 4 is stepped in the reverse ection, that is, from left to right, under the action of a wl 11 which drives a ratchet wheel 12, coaxially attached reel 3 in the clockwise direction. Pawl 11 is actuated wnwardly into a driving stroke by a solenoid 13, which energized by battery 14 through a switch 15, and is rerned upwardly to its disengaged position by a spring 16. is to be understood that the particular transport mechasm described herein is presented only to demonstrate e underlying principles of the invention, and that many her similarly functioning arrangements may be employed th equal facility.

The recording device of FIG. 1 is provided with circuit eans for magnetically recording binary information on pe 4 in accordance with the NRZ format. More parularly, a coil 17, wound in flux linking relation with ad 1, is energized by a battery 18 through a double le-double throw switch 19, and flux producing current, fficient to cause saturation of tape 4, is directed through e coil 17 in either direction depending upon the position, ft or right, of switch blades 20. The position of blades is governed in accordance with binary information to recorded on tape 4 which may originate from an apopriate data source such as computer 21. Although in e embodiment of the invention described herein the evice controlling the write function of the recorder is own as mechanical switch 19, such devices in practice sume many other conventional forms. Bridged across il 17 is a circuit comprising an indicating lamp 22 and switch 23. As shown in the drawing, switches 23 and 15 e ganged together to operate in unison. It will be exlained in detail below that the ignition of lamp 22 durg a testing operation indicates that the recorder is opering properly.

The operation of the recording device in executing the erification technique of the invention is best explained y reference to FIGS. 2A, 2B and 2C which show a typical RZ magnetic flux pattern of tape 4. The distances beveen the broken vertical lines represent single increental steps of the tape. It is seen from these patterns that xcept at a saturation reversal, the tape at all times resides a saturated condition in either one or the other magnetic olarities represented in the drawing by the usual symbols +" and "—". In the particular arrangement of the reording device shown in FIG. 1, coil 17 is wound such at when blades 20 are thrown left, as shown in the drawg, the flux produced in head 1 saturates tape 4 in the egative sense, while when blades 20 are thrown right, e flux produced in head 1 saturates the tape in the posive sense. In accordance with the NRZ method of recordg a reversal of the magnetic saturation of the tape, ither from "+" to "—" or from "—" to "+," represents ne particular symbol of binary information, for example one, while a maintenance of the magnetic saturation of e tape in the same polarity represents the other binary ymbol, for example a zero. Thus, the first three symbols f binary information recorded on tape 4 are seen to be ne, zero and one, in that order.

To record the first binary one on the tape, the posiion of blades 20 is shifted from left to right, thereby eversing the polarity of current in coil 17 and, conomitantly, changing the polarity of saturation of tape rom "—" to "+." Thereafter, switch 9 is momentarily losed, energizing solenoid 7 which actuates pawl 5 into lriving engagement with ratchet wheel 6. Accordingly, ape 4 is stepped from right to left under head 1 a single increment, thereby magnetically saturating the region of tape 4 passing under head 1 during this step in a positive sense. In practice switches 9 and 19 can be operated simultaneously since the inherent delay of the solenoid 7 insures that a saturation reversal will occur before the tape moves. When switch 9 reopens, pawl 5 is released and returned by spring 10 to its disengaged position. The foregoing polarity reversal of the tape saturation from "—" to "+" represents the binary symbol one. Since the second binary symbol to be recorded on tape 4 is a zero, the position of blades 20 remain unchanged and switch 9 is again momentarily closed. Tape 4 is thus moved a second increment from right to left and the region of the tape passing under head 1 during this increment is saturated in a positive sense. This second incremental translation of tape 4 without a saturation reversal represents a binary zero. In order to record the third binary symbol, a one in this case, the blades of switch 20 are shifted from right to left, reversing the polarity of saturation of the tape from "+" to "—," after which switch 9 is again momentarily closed. As a result, the tape is moved another increment from right to left and the region of the tape passing under the head during this increment is saturated in a negative sense.

In accordance with the principles of the invention, the foregoing apparatus is capable of being operated so as to provide an indication at any selected time that tape 4 is properly recording binary symbols. Assume, for example that it is desired to verify the proper operation of the recorder after the aforementioned one-zero-one sequence has been magnetically written into the tape. It will be recalled that after the last-mentioned one was recorded, switch 9 is momentarily closed, thereby stepping the tape one increment from right to left with respect to head 1. In order to now verify that the tape is properly recording information, a zero, indicated in FIG. 2A as $0_v$, is written onto the tap in the usual manner, that is to say, switch 9 is momentarily closed without reversing the position of blades 20. After tape 4 has completed its incremental step from right to left in response to this closure of switch 9, the position of the flux pattern on tape 4 relative to head 1 is as shown in FIG. 2A. Blades 20 are then switched from left to right, reversing the current in coil 17 and, concomitantly, reversing the saturation polarity of the tape from "—" to "+." This last-mentioned saturation reversal comprises a test signal, and is indicated in the drawing as $1_v$. Thereafter, blades 20 are thrown in an upright position which terminates current in coil 17 and leaves the tape at its remanence value as shown.

In order to verify that the tape has properly recorded the test signal $1_v$, switch 15 and its companion switch 23 are closed simultaneously. Accordingly, pawl 11 is actuated into driving engagement with ratchet wheel 12, which rotates reel 3 in the clockwise direction, and an operating path for lamp indicator 22 is completed through switch 23. As reel 3 is rotated in the clockwise direction, the tape is translated from left to right, resulting in the position of the flux pattern on tape 4 relative to head 1 being shifted to the position shown in FIG. 2B. As the saturation reversal $1_v$ is swept past head 1 on its rearward travel, a voltage is induced in coil 17 owing to the change of magnetic flux across the gap of head 1. This voltage, which is applied through switch 23, momentarily ignites lamp 22 and indicates that tape 4 has properly recorded test signal $1_v$.

After the rearward incremental step of tape 4 is complete, the position of the flux pattern relative to head 1, shown in FIG. 2B, is the same as immediately after the initial one-zero-one binary sequence was recorded. Blades 20 of switch 19 are then thrown left, thereby reinstating current in coil 17 of the same polarity as before the verification procedure was initiated. Accordingly, further binary information may now be recorded on tape 4 by means of the same recording procedure as described above. For example, if it is desired to record the binary sequence one-zero after the original one-zero-one sequence, as shown in FIG. 2C, blades 20 are now thrown from left to right, thereby reversing the polarity of saturation from "−" to "+," and switch 9 is momentarily closed two successive times. The first current reversal followed by an incremental step forward represents the binary symbol one, while the second incremental step forward without a saturation reversal represents a binary zero. Since current sufficient to saturate the tape in a positive sense is present in coil 17 during both incremental steps, the test signal $\mathbf{1}_v$ is erased as it is translated past head 1 during the second step. Accordingly, at the conclusion of recording, only data from computer 21 appears in the flux pattern on tape 4, all test signals written on the tape having been erased by the recordation subsequent to the verification procedure.

Although the technique of the present invention has been described above in terms of a single channel recorder having only one magnetic head, it will be recognized that the invention is equally applicable to recording devices having a plurality of recording channels and a corresponding plurality of magnetic heads. In such embodiments, the verification technique described above is employed simultaneously in all channels, and the concurrent ignition of the indicating devices, such as lamp 22, of all channels indicates the proper operation of all channels. It will be further recognized that the operation of switches 9 and 15 as well as switch 19 may be controlled manually as well as by a device such as computer 21, and that it is further within the contemplation of the invention that the verification procedure be undertaken automatically at periodic intervals. Although the verification technique of the present invention has been described solely in reference to the NRZ format of recording, it is to be understood that this technique is also applicable to other types of incremental magnetic recording as well.

Although only a single embodiment of the invention and a single associated verification technique have been described herein, it is to be understood that many modifications, adaptations and variations may be derived without departing from the spirit and scope of the invention.

What is claimed is:

1. The method of verifying the proper operation of a magnetic storage device which records information on a magnetic medium by reversing the polarity of current in the write coil of a magnetic head associated with said device while said head and said medium are stationary relative to each other, and thereafter moving said medium a single increment forward relative to said head, said method comprising the steps of moving said medium two increments forward relative to said head, maintaining the polarity of current in said write coil unchanged between said increments, reversing the polarity of current in said write coil after said two increments are complete, terminating the current in said write coil, moving said medium a single increment backward relative to said head, sensing an output signal induced in said write coil during said backward increment, and reinstating the current in said write coil with the same polarity as the current before said polarity reversal.

2. The method of verifying the proper operation of a magnetic storage device in which information in a binary system of notation is recorded on a magnetic medium by reversing the polarity of current in the coil of a magnetic head associated with said medium and thereafter moving said medium a single increment forward relative to said head, and by maintaining the polarity of current in said coil unchanged and thereafter moving said medium a single increment forward relative to said head, said method comprising the steps of initiating a unidirectional current in said coil, moving said medium a single increment forward relative to said head, reversing the polarity of said current after said incremental movement forward is complete and while said head and said medium are stationary relative to each other, terminating said current in said coil, moving said medium a single increment backward relative to said head, sensing an output signal induced in said coil during said backward motion, and reinitiating said current in said coil with the same polarity as the current before said polarity reversal.

3. The method of verifying the proper operation of a magnetic storage device in which useful information is recorded on a magnetic medium by varying the polarity of unidirectional current in a coil associated with an electro-magnetic transducer and moving said medium forward relative to said transducer, said method comprising the steps of magnetically recording a verification signal on said medium, moving said medium backward relative to said transducer after said verification signal is recorded, sensing said verification signal during said backward motion, moving said medium forward relative to said transducer after said verification signal has been sensed, recording said useful information on said medium with said transducer during said forward motion, and erasing said verification signal with said transducer during said step of recording.

4. The method of verifying the proper operation of a magnetic storage device in which information encoded in a binary system of notation is recorded on a magnetic medium by varying the polarity of unidirectional current in a coil associated with an electromagnetic transducer and moving said medium relative to said transducer, said method comprising the steps of initiating a unidirectional current in said coil, recording information on said medium in part by maintaining the polarity of current in said coil unchanged while said transducer and said medium are stationary relative to each other and then moving said medium an incremental step forward relative to said transducer, thereby to record one symbol of information on said medium in said system of notation, and in part by reversing the polarity of current in said coil while said transducer and said medium are stationary relative to each other and then moving said medium an incremental step forward relative to said transducer, thereby to record another symbol of information on said medium in said system of notation, and verifying that said medium is properly recording information thereon by the steps of maintaining the polarity of current in said coil unchanged after one of said incremental steps has been completed, moving said medium forward relative to said transducer, reversing the polarity of current in said coil after said last-mentioned forward movement is completed and while said medium and said transducer are stationary relative to each other, terminating the current in said coil, moving said medium an incremental step backward relative to said transducer, sensing an output signal from said coil during said backward step, thereby to indicate that said medium is recording information properly, and reinstating unidirectional current in said coil with the same polarity as immediately before the last-mentioned current reversal.

5. In a magnetic recording device comprising a magnetic recording medium, means for stepping said medium in a forward direction in discrete increments, an electromagnetic transducer disposed in flux linking relation with said medium, means for applying a unidirection current to said transducer, and means for reversing the polarity of said current applied to said transducer during interstep intervals of said medium, apparatus for verifying the proper operation of said recorder comprising means including said transducer for recording a verification signal on said medium, means for stepping said medium in a backward direction at a least a single discrete increment, means including said transducer for detecting said verification signal during a backward step of said medium, and means including said transducer for removing said verification signal from said medium during forward stepping of said medium subsequent to said backward step.

6. Apparatus in accordance with claim 5 wherein said ans for recording a verification signal on said medium ther includes means for reversing the polarity of said rent in said transducer and means for terminating d current in said transducer after its polarity is reversed.

7. Apparatus in accordance with claim 6 wherein said ans for removing said verification signal from said dium further includes means for reinstating current in d transducer after said backward step is complete, the larity of said reinstated current being the same as the polarity of transducer current immediately prior to the last reversal.

References Cited

UNITED STATES PATENTS

| | | | |
|---|---|---|---|
| 2,793,344 | 6/1957 | Reynolds ---------- | 340—174.1 |
| 3,261,003 | 7/1966 | Cogar et al. ------ | 340—174.1 |

BERNARD KONICK, *Primary Examiner.*

A. I. NEUSTADT, *Assistant Examiner.*